(12) United States Patent
Schutt

(10) Patent No.: US 9,273,504 B2
(45) Date of Patent: Mar. 1, 2016

(54) SPRING WINDING DEVICE FOR USE WITH OVERHEAD DOORS

(71) Applicant: Arrow Tru-Line, Inc., Archbold, OH (US)

(72) Inventor: Gerald Schutt, Whitehouse, OH (US)

(73) Assignee: Arrow Tru-Line, Inc., Archbold, OH (US)

( * ) Notice: Subject to any disclaimer, the term of this patent is extended or adjusted under 35 U.S.C. 154(b) by 92 days.

(21) Appl. No.: 13/938,285

(22) Filed: Jul. 10, 2013

(65) Prior Publication Data

US 2014/0027072 A1 Jan. 30, 2014

Related U.S. Application Data

(60) Provisional application No. 61/675,529, filed on Jul. 25, 2012.

(51) Int. Cl.
*E05D 15/24* (2006.01)
*E05D 13/00* (2006.01)

(52) U.S. Cl.
CPC ............ *E05D 15/24* (2013.01); *E05D 13/1261* (2013.01); *E05Y 2201/492* (2013.01); *E05Y 2201/618* (2013.01); *E05Y 2201/704* (2013.01); *E05Y 2800/692* (2013.01); *E05Y 2900/106* (2013.01); *Y10T 74/18792* (2015.01)

(58) Field of Classification Search
CPC . E05D 13/1253; E05D 13/1261; E05D 15/24; E05Y 2201/704; E05Y 2201/492; E05Y 2800/692; E05Y 2900/10; Y10T 74/18792
USPC .................................. 160/191, 192, 315, 318
See application file for complete search history.

(56) References Cited

U.S. PATENT DOCUMENTS

| | | | | |
|---|---|---|---|---|
| 2,083,467 A | * | 6/1937 | Morris ........................ | 160/191 |
| 3,921,761 A | * | 11/1975 | Votroubek et al. ............ | 185/39 |
| 4,253,350 A | * | 3/1981 | De Tarr ........................ | 81/486 |
| 4,472,910 A | * | 9/1984 | Iha ............................... | 49/139 |
| 4,882,806 A | * | 11/1989 | Davis ........................... | 16/198 |
| 5,419,010 A | * | 5/1995 | Mullet ................ | E05D 13/1261 16/198 |
| 5,632,063 A | * | 5/1997 | Carper et al. .................. | 16/198 |
| 5,865,235 A | * | 2/1999 | Krupke et al. ............... | 160/191 |
| 6,125,582 A | * | 10/2000 | Mondragon et al. ........... | 49/200 |
| 6,408,925 B1 | * | 6/2002 | Dorma ......................... | 160/191 |
| 6,959,751 B2 | * | 11/2005 | Savard et al. ............... | 160/315 |
| 8,567,567 B1 | * | 10/2013 | Turner et al. ................. | 185/39 |
| 8,936,063 B1 | * | 1/2015 | Trujillo et al. ............... | 160/191 |
| 2014/0027072 A1 | * | 1/2014 | Schutt ........................ | 160/191 |

* cited by examiner

*Primary Examiner* — Blair M Johnson
(74) *Attorney, Agent, or Firm* — Marshall & Melhorn, LLC

(57) ABSTRACT

A spring winding device, a counterbalancing force adjustment device for a counterbalancing mechanism, and a method of adjusting an amount of force stored in a spring of a counterbalancing mechanism are provided. The spring winding device includes a support bracket, a worm gear, and a drive gear. The worm gear is rotatably coupled to the support bracket and includes a mount portion for coupling a first end cone thereto. The drive gear is rotatably disposed adjacent the support bracket and is drivingly engaged with the worm gear. A rotation of the drive gear causes the worm gear to rotate within the support bracket. The spring winding device does not require pretensioning using winding rods, maintains rigidity and alignment when a counterbalancing force is applied, and decreases a cost and a complexity of the counterbalancing mechanism.

10 Claims, 9 Drawing Sheets

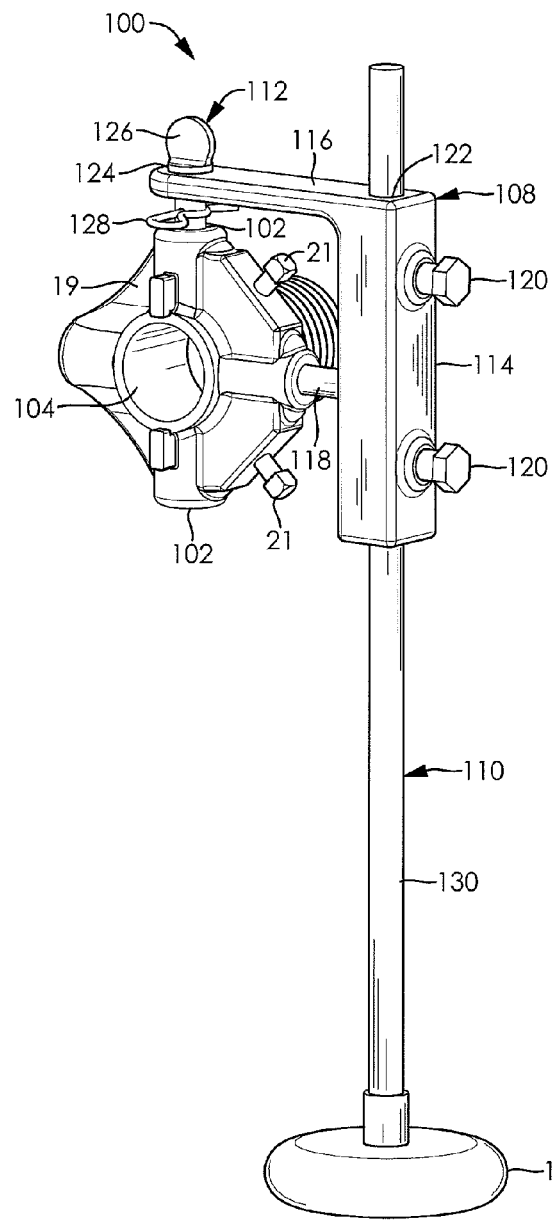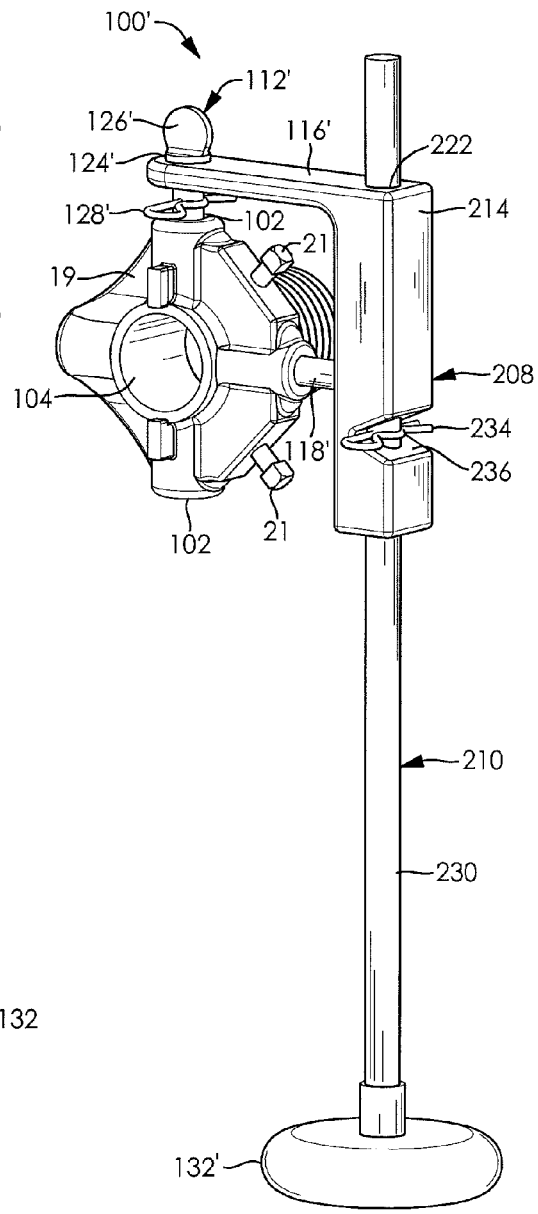
FIG. 6
FIG. 7

SPRING WINDING DEVICE FOR USE WITH OVERHEAD DOORS

CLAIM OF PRIORITY

The present application claims the benefit of and incorporates by reference U.S. Provisional Application No. 61/675,529 filed Jul. 25, 2012, entitled "SPRING WINDING DEVICE FOR USE WITH OVERHEAD DOORS."

FIELD OF THE INVENTION

The present invention relates to a spring winding device, such as for use in pretensioning a counterbalance spring used with an overhead door.

BACKGROUND OF THE INVENTION

Conventionally, a torsion spring counterbalancing mechanism may be used with an overhead door to counterbalance a weight of the overhead door when moving the overhead door during between an open position and a closed position. When the torsion spring counterbalancing mechanism is installed, one or more springs forming a portion of the torsion spring counterbalancing mechanism need to be pretensioned with an amount of counterbalancing force. Further, following initial installation, adjustment of the amount of counterbalancing force may be necessary to repair or replace the torsion spring counterbalancing mechanism.

A conventional method used to adjust the amount of counterbalancing force in one or more springs forming a portion of the torsion spring counterbalancing mechanism may be dangerous. Winding rods are typically inserted into a spring end cone, a rotational force is applied to the one or more springs, the spring end cone is disengaged from a torsion shaft, and the amount of counterbalancing force is one of increased and decreased. When a first winding rod is inserted in the spring end cone, the rotational force may be applied to the one or more springs. Using a second winding rod and an iterative process, the one or more springs may be wound or unwound. Such a process may be dangerous, as the winding rod will rotate quickly when the one or more springs are pretensioned and the winding bar is unrestrained.

To reduce such a danger, it is known in the prior art to employ a spring winder having a worm drive gear engaged with a worm wheel to adjust the amount of counterbalancing force. The worm wheel is fitted about a center portion of the torsion shaft and the worn drive gear is rotated to adjust the amount of counterbalancing force in the one or more springs. However, when the one or more springs are pretensionsed, the worm wheel may tilt or move along its axis as it resists the counterbalancing force. When the worn wheel tilts or moves along its axis, the worn drive gear may become disengaged or misaligned, rendering such a spring winder inoperable.

It is also known in the prior art to locate the spring winder having the worm drive gear engaged with the worm wheel at an end of the torsion shaft to militate against movement of the worm wheel. In such an arrangement a separate spring winder is employed for each spring, and the spring winder is subject to a thrust force of the spring. Balancing the thrust force of the spring may extend a service life of the spring significantly. Further, in such an arrangement, non-conventional cable drums are employed to house a portion of the spring winder. The spring winder having the worm wheel at an end of the torsion shaft increases a cost and a complexity of the counterbalancing mechanism while decreasing a service life of the one or more springs.

It would be advantageous to develop a spring winding device that does not require pretensioning using winding rods, maintains rigidity and alignment when a counterbalancing force is applied, and decreases a cost and a complexity of a counterbalancing mechanism the spring winding device is incorporated in.

SUMMARY OF THE INVENTION

Presently provided by the invention, a driveline including a continuously variable transmission that is inexpensive, compact, may be configured for a wide range of torque distributions, and able to adjust a drive ratio has surprisingly been discovered.

In one embodiment, the present invention is directed to a spring winding device for a counterbalancing mechanism. The spring winding device comprises a support bracket, a worm gear, and a drive gear. The worm gear is rotatably coupled to the support bracket and includes a mount portion for coupling a first end cone thereto. The drive gear is rotatably disposed adjacent the support bracket and is drivingly engaged with the worm gear. A rotation of the drive gear causes the worm gear to rotate within the support bracket.

In another embodiment, the present invention is directed to a counterbalancing force adjustment device for a counterbalancing mechanism. The counterbalancing force adjustment device comprises an anti-rotation device and a spring winding device. The anti-rotation device comprises an elongate member and a bumper portion. The bumper portion is coupled to the elongate member. The spring winding device comprises a support bracket, a worm gear, and a drive gear. The worm gear is rotatably coupled to the support bracket. The worm gear includes a mount portion for coupling a first end cone thereto. The drive gear is rotatably disposed adjacent the support bracket. The drive gear is drivingly engaged with the worm gear. The anti-rotation device is drivingly engaged with a second end cone to militate against a rotation thereof. A rotation of the drive gear causes the first end cone to rotate with the worm gear, causing an amount of counterbalancing force stored in a torsion spring coupled to the first end cone and the second end cone to be adjusted.

In another embodiment, the present invention is directed to a method of adjusting an amount of force stored in a pair of springs of a counterbalancing mechanism. The method comprises the steps of providing a first spring disposed about a shaft, the first spring and shaft forming a portion of the counterbalancing mechanism, the first spring drivingly engaged with the shaft at a first end thereof; providing a second spring disposed about the shaft, the second spring and shaft forming a portion of the counterbalancing mechanism, the second spring drivingly engaged with the shaft at a first end thereof; providing a spring winding device for the counterbalancing mechanism, the spring winding device comprising a rotatable portion for coupling a second end of the first spring and a second end of the second spring thereto; and adjusting the amount of force stored in the pair of springs of the counterbalancing mechanism simultaneously by rotating the rotatable portion of the spring winding device.

In another embodiment, the present invention is directed to a method of adjusting an amount of force stored in a spring of a counterbalancing mechanism. The method comprises the steps of providing the spring disposed about a shaft having a keyway formed therein, the spring and shaft forming a portion of the counterbalancing mechanism, the spring drivingly engaged with the shaft at a first end thereof through the use of a keyed mounting cone, the keyed mounting cone able to be moved along the keyway of the shaft; providing a spring winding device for the counterbalancing mechanism, the spring winding device comprising a rotatable portion for coupling a second end of the first spring and a second end of the second spring thereto; and adjusting the amount of force stored in the counterbalancing mechanism by rotating the rotatable portion of the spring winding device, wherein in response to the amount of force stored in the counterbalancing mechanism being adjusted, a position of the keyed mounting cone moves along the shaft as a length of the spring changes.

In another embodiment, the present invention is directed to a method of adjusting an amount of force stored in a spring of a counterbalancing mechanism. The method comprises the steps of providing the spring disposed about a shaft, the spring and shaft forming a portion of the counterbalancing mechanism, the spring drivingly engaged with the shaft at a first end thereof; providing a spring winding device for the counterbalancing mechanism, the spring winding device comprising a support bracket, a worm gear rotatably coupled to the support bracket, the worm gear including a mount portion for coupling a second end of the spring thereto, and a drive gear rotatably disposed adjacent the support bracket, the drive gear drivingly engaged with the worm gear, wherein a rotation of the drive gear causes the worm gear to rotate within the support bracket; providing an anti-rotation device comprising an elongate member and a bumper portion, the bumper portion coupled to the elongate member; drivingly engaging the anti-rotation device with the first end of the spring; releasing the first end of the spring from driving engagement with the shaft; adjusting the amount of force stored in the counterbalancing mechanism by rotating the drive gear; drivingly engaging the first end of the spring with the shaft; and releasing the anti-rotation device from driving engagement with the first end of the spring.

Various aspects of this invention will become apparent to those skilled in the art from the following detailed description of the preferred embodiment, when read in light of the accompanying drawings.

BRIEF DESCRIPTION OF THE DRAWINGS

The above, as well as other advantages of the present invention, will become readily apparent to those skilled in the art from the following detailed description when considered in the light of the accompanying drawings in which:

FIG. 1A is a side view of an end cone and a torsion shaft according to another embodiment of the present invention;

FIG. 6 is a perspective view of an anti-rotation device according to an embodiment of the present invention;

FIG. 7 is a perspective view of an anti-rotation device according to another embodiment of the present invention;

DETAILED DESCRIPTION OF THE INVENTION

Figure 1:
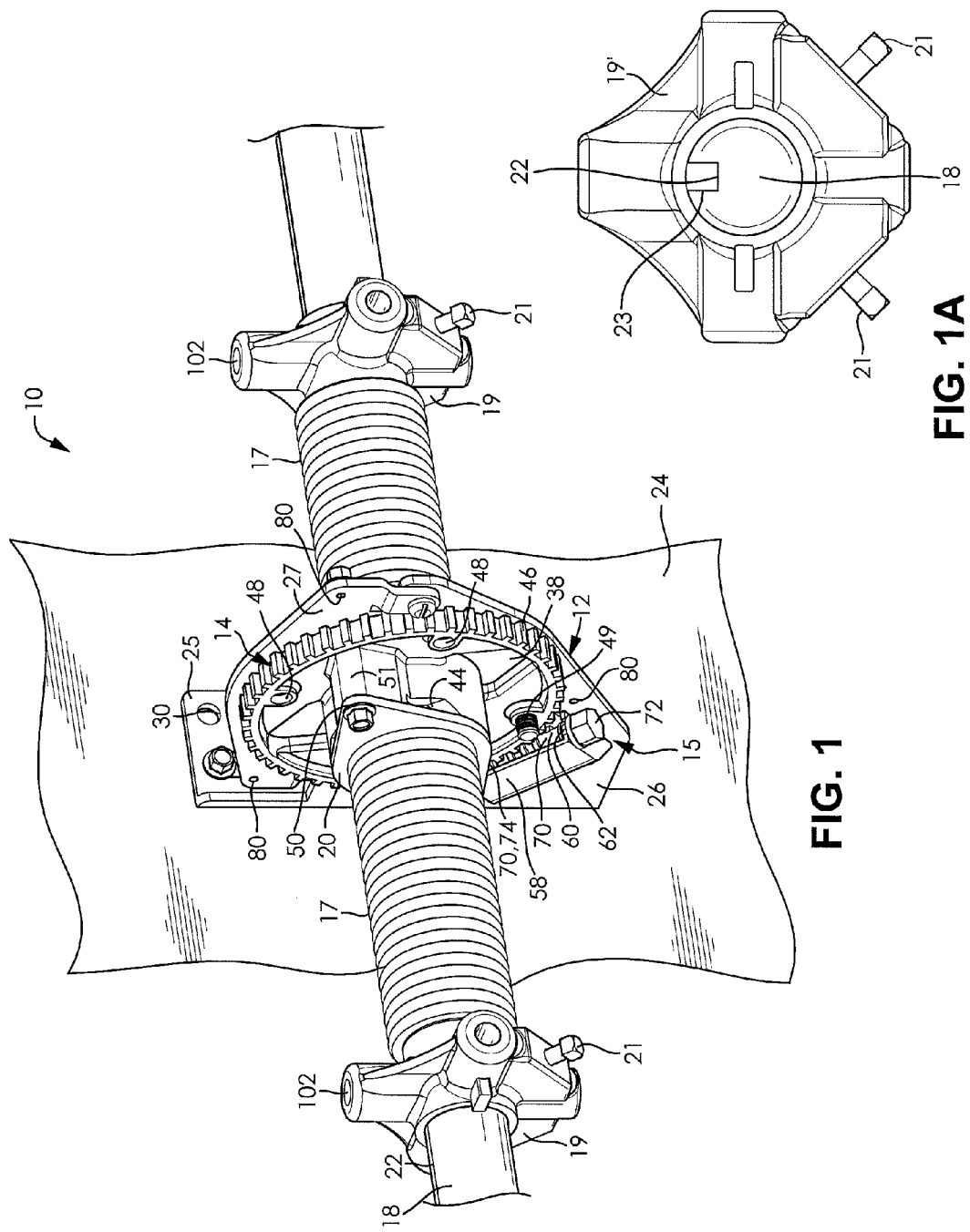
FIG. 1 is a perspective view of a spring winding device according to an embodiment of the present invention.

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

FIGS. 1, 2, 3, 4 and 11 illustrate a spring winding device 10 according to an embodiment of the invention. The spring winding device 10 forms a portion of a counterbalancing mechanism (partially shown) for an overhead door (not shown) and preferably comprises a support bracket 12, a flanged worm gear 14, a drive gear assembly 15, and a gear shroud 16 (shown in FIGS. 5 and 11). As shown, the spring winding device 10 is mounted above the overhead door placed in a closed position. As a non-limiting example, the overhead door may be a residential garage door.

The counterbalancing mechanism also includes two torsion springs 17 and a torsion shaft 18. Each of the torsion springs 17 include a first end cone 19 and a second end cone 20 fixed to opposing ends of the torsion spring 17. Each of the first end cones 19 as shown is known in the art as a winding cone, and may be coupled to the torsion shaft 18 using at least one set screw 21. Each of the second end cones 20 as shown is known in the art as a stationary cone, and is coupled to the flanged worm gear 14 using at least one fastener. The spring winding device 10 is disposed about the torsion shaft 18, which also forms a portion of the counterbalancing mechanism. The torsion shaft 18 is a conventional torsion shaft, and is well known in the art.

Figure 11:
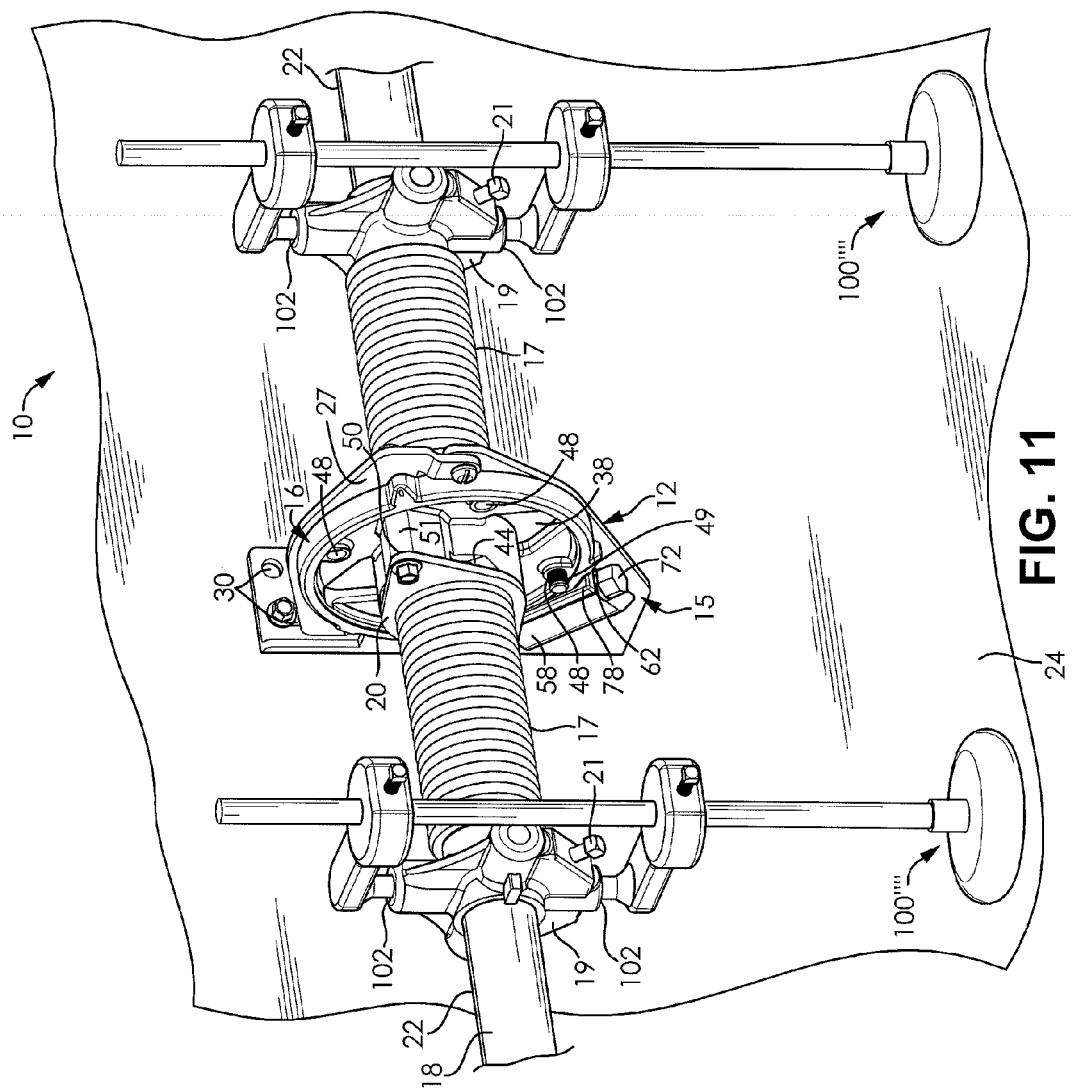
FIG. 11 is a perspective view of the spring winding device shown in FIG. 1 including the gear shroud shown in FIG. 5, the spring winding device being used with the anti-rotation device shown in FIG. 10.

As shown in FIGS. 1 and 11, the torsion shaft 18 is a torsion shaft having a keyway 22 formed therein. The keyway 22 formed therein may be disposed through a keyed end cone 19' having a key 23 formed thereon, shown in FIG. 1A. The keyed end cone 19' having the key 23 is drivingly engaged with the keyway 22 of the torsion shaft 18. The keyed end cone 19' is able to be moved along a length of the torsion shaft 18 while maintaining driving engagement with the torsion shaft 18. The keyed end cone 19' is able to move along the torsion shaft 18 as an amount of counterbalancing force stored in each of the torsion springs 17 coupled thereto is adjusted. It is understood that when the amount of counterbalancing force stored in each of the torsion springs 17 is adjusted, a length of each of the torsion springs 17 changes. In response to the length of each of the torsion springs 17 changing, each of the keyed end cones 19' moves along the torsion shaft 18. The keyed end cone 19' having the key 23 formed thereon eliminates a need for an anti-rotation device when an amount of counterbalancing force stored in each of the torsion springs 17 is adjusted. The keyed end cone 19' militates against a binding that may occur to the torsion springs 17 if the amount of counterbalancing force stored in each of the torsion springs 17 is adjusted without allowing the length of each of the torsion springs 17 to change.

The support bracket 12 is a L-shaped member mounted to a wall 24 above a frame (not shown) for the overhead door. The support bracket 12 includes a mounting portion 25 and a main portion 26. A retaining portion 27 is coupled to the support bracket 12. A drive gear assembly aperture 28, a flanged worm gear fastening perforation 29, and a plurality of mounting apertures 30 are formed through the main portion 26 and the mounting portion 25. A portion of an outer peripheral edge of the main portion 26 and a portion of an outer peripheral edge of the retaining portion 27 define a torsion shaft perforation 32. The support bracket 12 is preferably formed by stamping and bending a sheet metal such as steel; however, it is understood that the support bracket may be formed with other processes from other materials.

The mounting portion 25 has a rectangular shape and includes at least two mounting apertures 30 formed therethrough. As most clearly shown in FIG. 2, the mounting apertures 30 may be circular apertures or elongate apertures. A plurality of fasteners, such as screws, bolts, or the like, is disposed through the mounting apertures 30 and couple the support bracket 12 to the wall 24. It is understood that the mounting portion 25 may include a bracket adjustment device (not shown). The bracket adjustment device allows a position of the support bracket with respect to the wall 24 to be adjusted. The bracket adjustment device facilitates installation and service of the counterbalancing mechanism the spring winding device 10 forms a portion of.

The main portion 26 is an elongate portion of the support bracket 12 and includes the drive gear assembly aperture 28 formed therethrough. As most clearly shown in FIG. 3, the drive gear assembly aperture 28 is substantially rectangular in shape and also defines an alignment tab 34 and a drive gear retention tab 36. Alternately, the drive gear assembly aperture 28 may be any other shape. The alignment tab 34 is an elongate member bent away from and substantially orthogonal to a surface of the main portion 26. The drive gear retention tab 36 is an elongate member bent away from and substantially orthogonal to a surface of the main portion 26. The drive gear retention tab 36 is formed adjacent the alignment tab 34 and is bend in an opposing direction with respect to the alignment tab 34. At least one flanged worm gear fastening perforation 29 is formed through the main portion 26. The flanged worm gear fastening perforation 29 is an elongate perforation; however, it is understood that that flanged worm gear fastening perforation 29 may have another shape. As mentioned hereinabove, a portion of the outer peripheral edge of the main portion 26 partially defines the torsion shaft perforation 32. The torsion shaft perforation 32 is substantially circular in shape.

The retaining portion 27 is a member coupled to the main portion 26. As shown in FIGS. 1-3 and 11, the retaining portion 27 is coupled to the main portion 26 using a plurality of rivets disposed through perforations formed through the main portion 26 and the retaining portion 27; however it is understood that the retaining portion 27 may be coupled to the main portion 26 using any conventional fastener. As mentioned hereinabove, a portion of the outer peripheral edge of the retaining portion 27 partially defines the torsion shaft perforation 32. The retaining portion 27 is preferably formed by stamping and bending a sheet metal such as steel; however, it is understood that the support bracket 12 may be formed with other processes from other materials.

The flanged worm gear 14 is a disposed between the main portion 26 and the retaining portion 27, through the torsion shaft perforation 32. When not coupled to the support bracket 12, the flanged worm gear 14 is a rotatable portion of the spring winding device 10. The flanged worm gear 14 includes a gear portion 38 and a first end cone mount portion 40. A support recess 42 is formed between the gear portion 38 and the first end cone mount portion 40. A torsion shaft aperture 44 is formed through the flanged worm gear 14. The flanged worm gear 14 is formed by casting and machining a metal; however, it is understood that other processes may be used to form the flanged worm gear 14.

The gear portion 38 is a disc shaped member having a toothed outer edge 46. The toothed outer edge 46 of the gear portion 38 is in driving engagement with the drive gear assembly 16. A plurality of set perforations 48 are formed through the gear portion 38. Each of the set perforations 48 may be aligned with the flanged worm gear fastening perforation 29 when the flanged worm gear 14 is rotated about a gear portion axis. A fastener 49 is disposed through the flanged worm gear fastening perforation 29 and one of the set perforations 48 to couple the flanged worm gear 14 to the support bracket 12. As shown in FIGS. 1, 2, 3, 4 and 11, the fastener 49 is a fastener having threads corresponding to threads formed in the set perforations 48; however, it is understood that the fastener 49 may be any conventional fastener. The gear portion axis is substantially coincident to an axis of the torsion shaft 18. At least two cone mounting perforations 50 are formed in a second end cone mount portion 51. The second end cone mount portion 51 comprises two protuberances extending away from the gear portion 38; however, it is understood that the second end cone mount portion 51 may comprise other shapes or that the gear portion 38 may not include the second end cone mount portion 51. Preferably, the cone mounting perforations 50 are threaded, however, it is understood that the cone mounting perforations 50 may be configured for any type of fastener.

The first end cone mount portion 40 is a flanged shape member spaced apart from the gear portion 38. As most clearly shown in FIG. 3, the first end cone mount portion 40 includes a hollow central cylindrical portion 52 and two radially extending protuberances 54. At least two cone mounting perforations 56 are formed in the radially extending protuberances of the first end cone mount portion 40. Preferably, the cone mounting perforations 56 are threaded, however, it is understood that the cone mounting perforations 56 may be configured for any type of fastener.

As shown in FIGS. 1-3 and 11, when the counterbalancing mechanism including the spring winding device 10 is in an installed condition, each of the second end cones 20 is coupled to the end cone mount portion 40 and the second end cone mount portion 51 using fasteners inserted through each of the second end cones 20 and into the cone mounting perforations 50, 56. Alternately, it is understood that the second end cones 20 may be integrally formed with the gear portion 38 or coupled to the gear portion 38 in any other conventional manner.

The support recess 42 is a recess between the gear portion 38 and the two radially extending protuberances 54. A portion of the first end cone mount portion 40 having a reduced diameter defines the support recess 42. When the flanged worm gear 14 is disposed in the support bracket 12, at least a portion of the main portion 26 and the retaining portion 27 enter and rotatably support the flanged worn gear 14. A width of the support recess 42 is slightly greater than a thickness of the main portion 26 and the retaining portion 27, permitting the main portion 26 and the retaining portion 27 to be disposed therein. The width of the support recess 42 militates against a substantial axial deviation of the flanged worm gear 14 within the support bracket 12.

The drive gear assembly 16 is coupled to the main portion 26 of the support bracket 12. The drive gear assembly 16 includes a drive gear housing 58 and a drive gear 60. The drive gear housing 58 is coupled to the main portion 26 and the drive gear 60 is rotatably disposed in the drive gear housing 58. As shown in FIGS. 1, 2, 3, 4 and 11, the drive gear assembly 16 includes a single drive gear; however, it is understood that the drive gear assembly may include two or more drive gears arranged in a gear train to facilitate adjusting an amount of counterbalancing force in one or more torsion springs.

Figure 2:
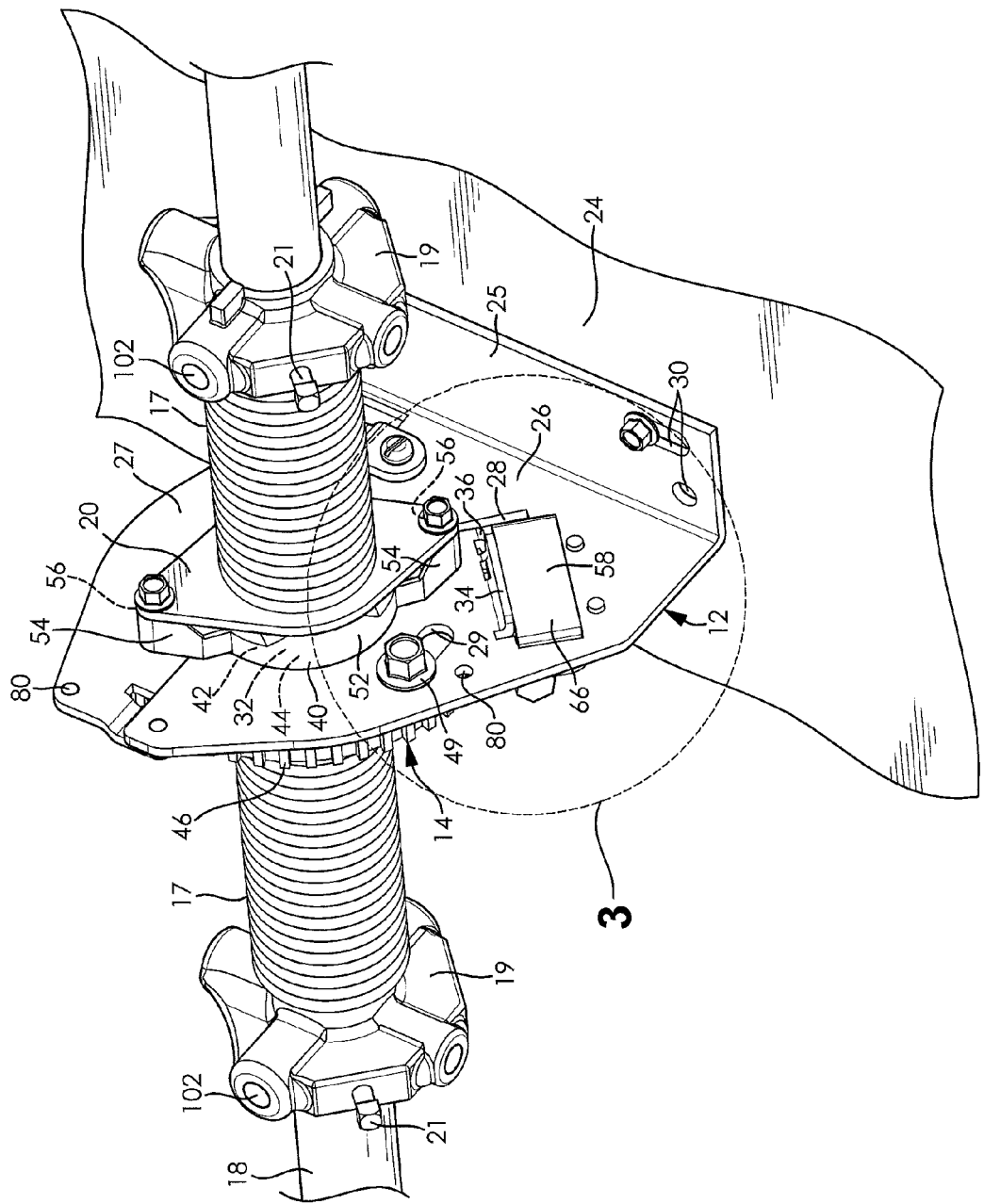
FIG. 2 is a perspective view of the spring winding device shown in FIG. 1.
Figure 3:
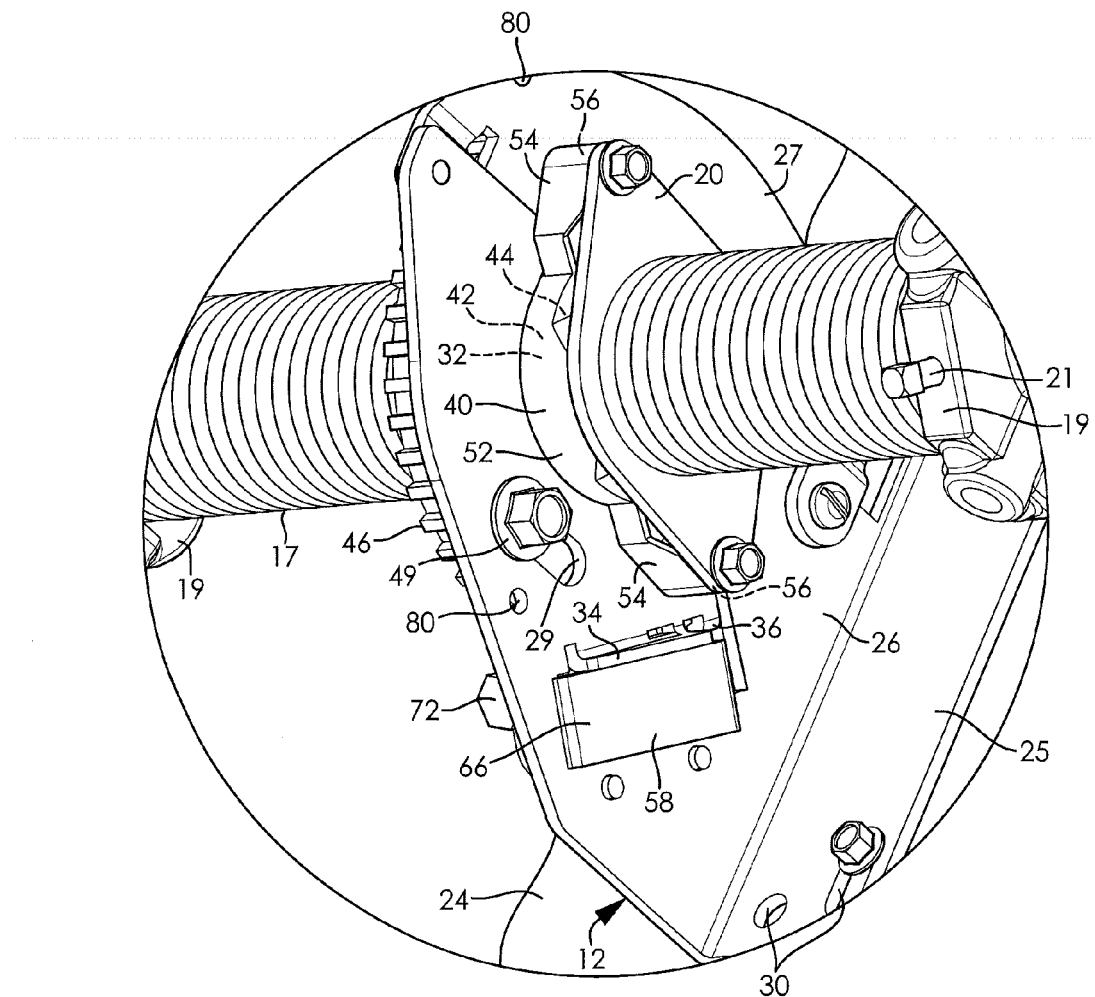
FIG. 3 is a perspective view of the spring winding device shown in FIG. 1.
Figure 4:
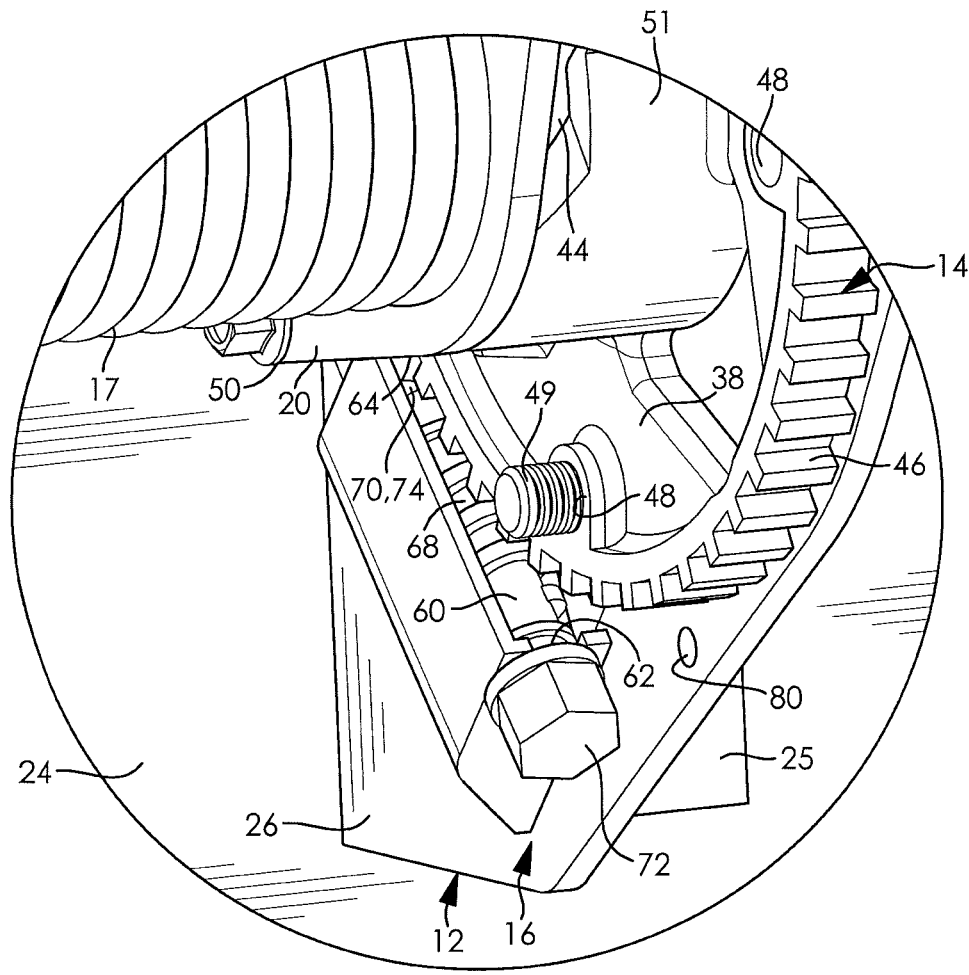
FIG. 4 is a perspective view of the spring winding device shown in FIG. 1.

The drive gear housing 58 is a member formed by casting and machining a metal such as steel; however, it is understood that the drive gear housing 58 may be formed with other processes from other materials. The drive gear housing 58 is disposed in the drive gear assembly aperture 28 and coupled to the main portion 26. A first drive gear slot 62 and a second drive gear slot 64 are formed in opposing portions of the drive gear housing 58. The first drive gear slot 62 and the second drive gear slot 64 align and rotatably support the drive gear 60 when the spring winding device 10 is assembled. As most clearly shown in FIGS. 3 and 4, a plurality of mounting perforations corresponding to mounting perforations formed through the main portion 26 receive rivets to couple the drive gear housing 58 to the main portion 26. However, it is understood the drive gear housing 58 may be coupled to the main portion 26 in any conventional manner. The drive gear housing 58 also includes an alignment tab 66 extending from a remaining portion of the drive gear housing 58. When the drive gear housing 58 is coupled to the main portion 26, the alignment tab 66 is disposed through the drive gear assembly aperture 28 and supported by the main portion 26. When the drive gear housing 58 is coupled to the main portion 26, a portion of the drive gear housing 58 is disposed against the alignment tab 34, as shown in FIGS. 2 and 3.

The drive gear 60 is a threaded member rotatably disposed in the drive gear housing 58. When the spring winding device 10 is assembled, at least one thread 68 formed in the drive gear 60 is in driving engagement with the toothed outer edge 46 of the flanged worm gear 14. The drive gear 60 includes two annular journals 70 which are disposed in the drive gear slots 62, 64 and militate against axial movement of the drive gear 60 with respect to the drive gear housing 58. A drive end 72 of the drive gear 60 is disposed adjacent an outer surface of the drive gear housing. As most clearly shown in FIG. 4, the drive end 72 includes a hexagonal shaped protuberance for drivingly engaging a driving tool (not shown); however, it is understood that the drive end 72 may include other features formed therein for engaging other drive tools. When the driving tool is engaged with the drive end 72 and the driving tool is rotated, the drive gear 60 rotates and the at least one thread 68 applies a force to the toothed outer edge 46 of the flanged worm gear 14, causing the flanged worm gear 14 to rotate within the support bracket 12. When the drive gear 60 is disposed in the drive gear housing 58, a second end 74 of the drive gear 60 is disposed adjacent to or abuts the drive gear retention tab.

Figure 5:
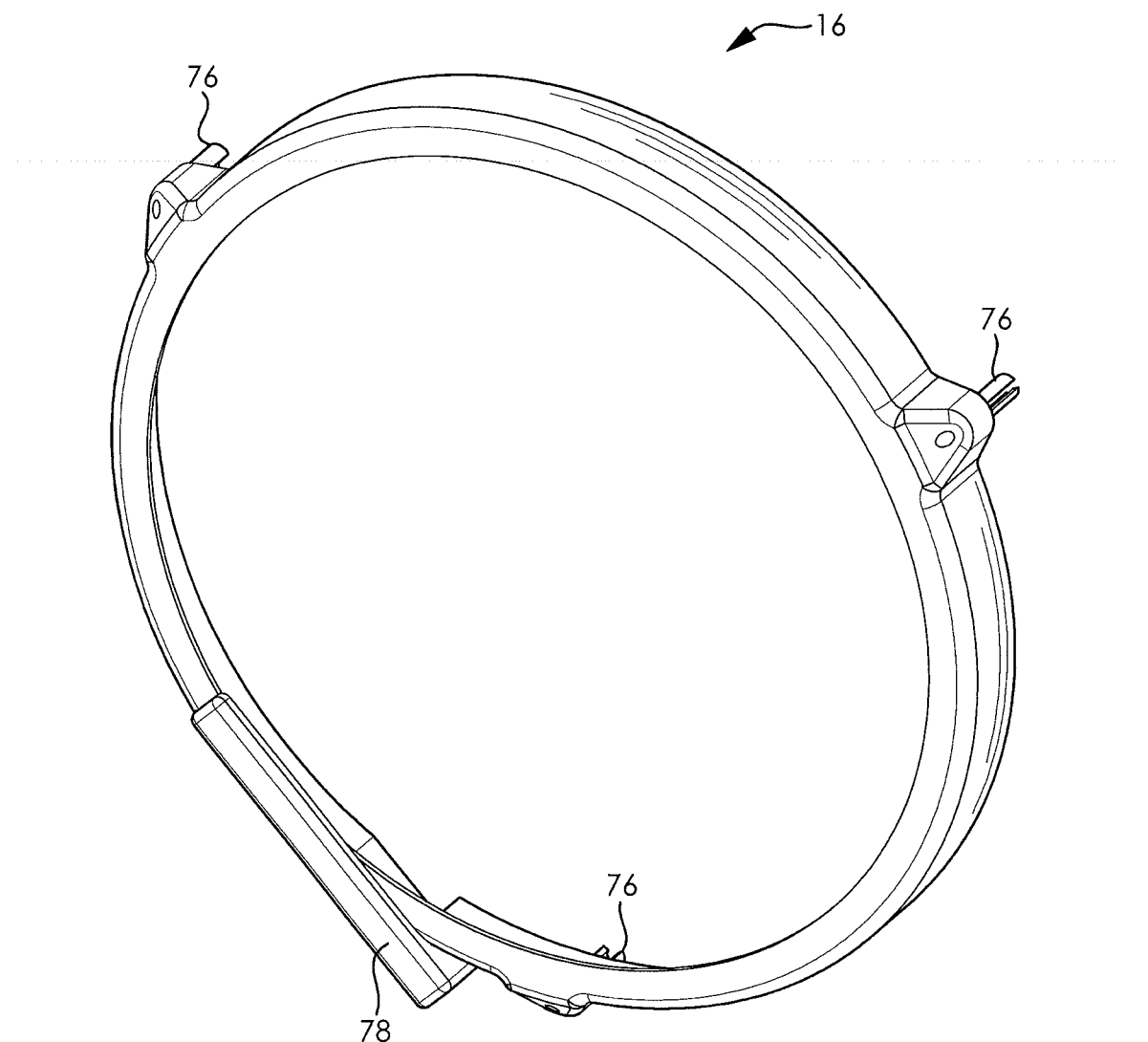
FIG. 5 is a perspective view of a gear shroud used with the spring winding device shown in FIG. 1.

As shown in FIGS. 5 and 11, the gear shroud 16 is a ring shaped member coupled to the support bracket 12. The gear shroud 16 is formed from a plastic using a molding process; however, it is understood that the gear shroud 16 may be formed from other materials using other processes. The gear shroud 16 has a substantially L-shaped cross-section and encloses at least a portion of the flanged worm gear 14. Further, it is understood that the gear cover may enclose at least a portion of the drive gear assembly 16. It is also understood that the gear cover may form a portion of a torsion spring cover (not shown). The gear shroud 16 includes a plurality of shroud fasteners 76 and a drive gear protuberance 78. The gear shroud 16 militates against debris from collecting on or within the toothed outer edge 46, the drive gear housing 58, the drive gear 60. Further, the gear shroud 16 militates against an entanglement that may occur between a foreign object, the toothed outer edge 46, and the drive gear 60.

Each of the shroud fasteners 76 is a hollow, bifurcated protuberance having a barbed end. Each of the shroud fasteners correspond to a shroud perforation 80 formed in one of the main portion 26 and the retaining portion 27 of the support bracket 12. An elastic deformation of each of the shroud fasteners 76 allows each of the shroud fasteners 76 to be disposed in the shroud perforation 80, coupling the gear shroud 16 to the support bracket 12.

The drive gear protuberance 78 is a portion of the gear shroud 16 extending away from a remaining portion of the gear shroud 16. The drive gear protuberance 78 has a substantially rectangular shape; however, it is understood that the drive gear protuberance 78 may have other shapes or may be formed separate from the remaining portion of the gear shroud 16. When the gear shroud 16 is coupled to the support bracket 12, the drive gear protuberance 78 is disposed adjacent or abuts the drive gear housing 58.

FIG. 6 illustrates an anti-rotation device 100 for use with each of the first end cones 19. The anti-rotation device 100 may be used with the spring winding device 10 when the counterbalancing mechanism is installed or serviced. The anti-rotation device 100 is coupled to each of the first end cones 19 to resist a torque applied to the first end cones 19 when a tension of the torsion spring 17 is adjusted during installation or service of the counterbalancing mechanism. When the tension of the torsion spring 17 is adjusted during installation or service of the counterbalancing mechanism, the anti-rotation device 100 permits the first end cones 19 to move along the torsion shaft 18 to accommodate changes in length of the torsion spring 17 that occur during adjustment of the tension of the torsion spring 17. As shown in FIGS. 1, 2, and 11, the counterbalancing mechanism comprises two torsion springs, disposed on opposite sides of the spring winding device 10, and would require the use of two anti-rotation devices 100 to install or service the counterbalancing mechanism. FIG. 11 illustrates an anti-rotation device 100'''' according to another embodiment of the invention being used to install or service the counterbalancing mechanism.

As shown in FIGS. 1, 2, and 6-11, the first end cone 19 includes apertures 102 formed therein oriented transversely to a torsion shaft aperture 104. The first end cone 19 includes four apertures 102 formed therein, the apertures 102 spaced apart equally. The at least one set screw 21 is threadingly disposed in the first end cone 19 for coupling the first end cone 19 to the torsion shaft 18. The first end cone 19 is a conventional winding cone, and is well known in the art.

The anti-rotation device 100 includes a main body 108, an arm member 110, and a first cone pin 112. The arm member 110 and the first cone pin 112 are adjustably disposed within the main body 108. When the anti-rotation device 100 is coupled to the first end cone 19, the anti-rotation device 100 is in driving engagement therewith.

The main body 108 is a L-shaped member the arm member 110 and the first cone pin 112 are adjustably disposed within. The main body 108 includes a first leg 114, a second leg 116, a second cone pin 118, and at least one arm member fastener 120. An arm member perforation 122 is formed through the first leg 114 and a cone pin perforation 124 is formed through the second leg 116. The main body 108 is formed by casting and machining a metal; however, it is understood that other processes may be used to form the main body 108.

The first leg 114 is an elongate member having a rectangular cross section. The arm member perforation 122 is formed lengthwise through the first leg 114 and has a diameter which permits the arm member 110 to be disposed therethrough. The at least one arm member fastener 120 is threadingly disposed in a perforation that intersects the arm member perforation 122. When the at least one arm member fastener 120 is driven to engage the arm member 110 disposed in the arm member perforation 122, the arm member 110 is coupled to the main body 108. The second cone pin 118 extends outwardly from the first leg 114 and is coupled thereto in any conventional manner. A diameter of the second cone pin 118 substantially corresponds to the apertures 102 of the first end cone 19.

The second leg 116 is an elongate member having a rectangular cross section. The second leg 116 is oriented transversely to the first leg 114. The cone pin perforation 124 is formed through the second leg 116 transverse to the second cone pin 118 and has a diameter which permits the first cone pin 112 to be disposed therethrough. The first cone pin 112 is disposed through the cone pin perforation 124 and extends outwardly from the second leg 116 and is removably coupled thereto by a head 126 of the first cone pin 112 and a pin 128 removably disposed through a perforation in the first cone pin 112; however, it is understood that the first cone pin 112 may be removably coupled to the second leg 116 in any conventional manner. The first cone pin 112 includes a plurality of perforations formed therethrough, which permit a length of the first cone pin 112 extending through the cone pin perforation 124 to be adjusted by moving a location of the pin 128. A diameter of the first cone pin 112 substantially corresponds to the apertures 102 of the first end cone 19.

The arm member 110 is an elongate member having a shaft portion 130 and a bumper portion 132. The shaft portion 130 has a circular cross section and is rotatably coupled to the bumper portion 132 at a first end thereof. The shaft portion 130 is formed by forging a metal; however, it is understood that other processes may be used to form the shaft portion 130. The bumper portion 132 is a disc shaped member rotatably coupled to a distal end of the shaft portion 130. At least a portion of the bumper portion 132 is formed from a resilient material, such as rubber. However, it is understood that the bumper portion 132 may have other shapes and may be formed from other materials.

FIG. 7 shows an alternative embodiment of the anti-rotation device 100. Similar structural features of the anti-rotation device 100 include the same reference numeral and a prime (') symbol.

An anti-rotation device 100' includes a main body 208, an arm member 210, and a first cone pin 112'. The arm member 210 and the first cone pin 112' are adjustably disposed within the main body 208. When the anti-rotation device 100' is coupled to the first end cone 19, the anti-rotation device 100' is in driving engagement therewith.

The main body 208 is a L-shaped member the arm member 210 and the first cone pin 112' are adjustably disposed within. The main body 208 includes a first leg 214, a second leg 116', a second cone pin 118', and an arm member pin 234. An arm member perforation 222 is formed through the first leg 214 and a cone pin perforation 124' is formed through the second leg 116'. The main body 208 is formed by casting and machining a metal; however, it is understood that other processes may be used to form the main body 208.

The first leg 214 is an elongate member having a rectangular cross section. The arm member perforation 222 is formed lengthwise through the first leg 214 and has a diameter which permits the arm member 210 to be disposed therethrough. An arm member fastening slot 236 is formed in the first leg 214, the arm member fastening slot 236 intersecting the arm member perforation 222. The arm member fastening slot 236 is V-shaped; however, it is understood that other shapes may be used. The arm member pin 234 is disposed in the arm member fastening slot 236 and through one of a series of perforations formed in a shaft portion 230 of the arm member 210 to couple the arm member 210 to the main body 208. The second cone pin 118' extends outwardly from the first leg 214 and is coupled thereto in any conventional manner. A diameter of the second cone pin 118' substantially corresponds to the apertures 102 of the first end cone 19.

The second leg 116' is an elongate member having a rectangular cross section. The second leg 116' is oriented transversely to the first leg 214. The cone pin perforation 124' is formed through the second leg 116' transverse to the second cone pin 118' and has a diameter which permits the first cone pin 112' to be disposed therethrough. The first cone pin 112' is disposed through the cone pin perforation 124' and extends outwardly from the second leg 116' and is removably coupled thereto by a head 126' of the first cone pin 112' and a pin 128' removably disposed through a perforation in the first cone pin 112; however, it is understood that the first cone pin 112' may be removably coupled to the second leg 116' in any conventional manner. The first cone pin 112' includes a plurality of perforations formed therethrough, which permit a length of the first cone pin 112' extending through the cone pin perforation 124' to be adjusted by moving a location of the pin 128'. A diameter of the first cone pin 112' substantially corresponds to the apertures 102 of the first end cone 19.

The arm member 210 is an elongate member having the shaft portion 230 and a bumper portion 132'. The shaft portion 230 has a circular cross section and is rotatably coupled to the bumper portion 132' at a first end thereof. The shaft portion 230 includes a plurality of perforations formed therethrough, which permit a length of the shaft portion 230 extending through the arm member perforation 222 to be adjusted by moving a location of the arm member pin 234. The shaft portion 230 is formed by forging and machining a metal; however, it is understood that other processes may be used to form the shaft portion 230. The bumper portion 132' is a disc shaped member rotatably coupled to a distal end of the shaft portion 230. At least a portion of the bumper portion 132' is formed from a resilient material, such as rubber. However, it is understood that the bumper portion 132' may have other shapes and may be formed from other materials.

Figures 8, 9:
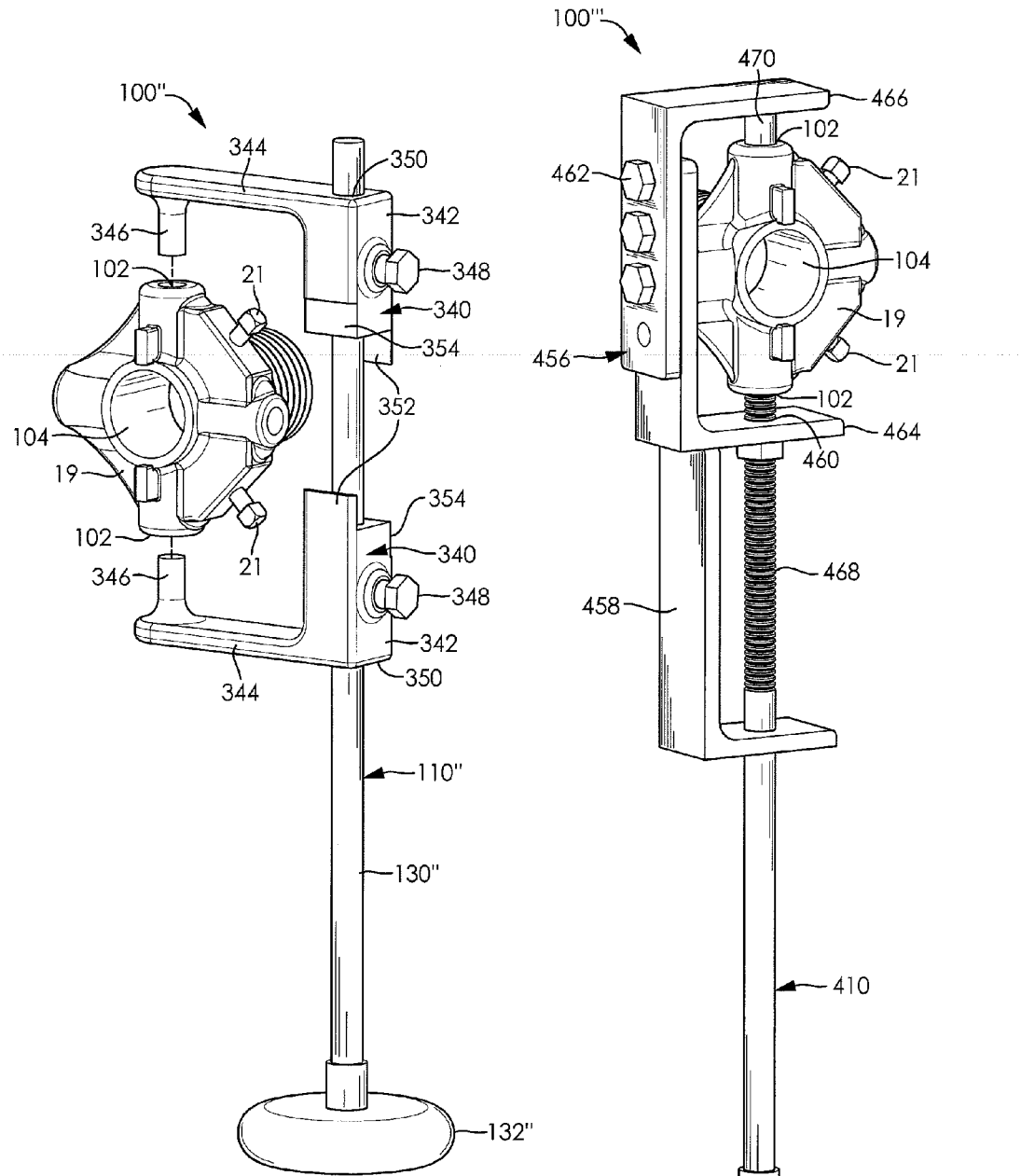
FIG. 8 is a perspective view of an anti-rotation device according to another embodiment of the present invention.
FIG. 9 is a perspective view of an anti-rotation device according to another embodiment of the present invention.

FIG. 8 shows an alternative embodiment of the anti-rotation device 100. Similar structural features of the anti-rotation device 100 include the same reference numeral and a double prime (") symbol.

An anti-rotation device 100" includes two main bodies 340 and an arm member 110". The arm member 110" is adjustably disposed within the main bodies 340. The main bodies are opposingly disposed on the arm member 110". When the anti-rotation device 100" is coupled to the first end cone 19, the anti-rotation device 100" is in driving engagement therewith. The anti-rotation device 100" is coupled to the first end cone 19 by moving each of the main bodies 340 along the arm member 110".

Each of the main bodies 340 is a U-shaped member the arm member 110" is adjustably disposed within. The main body 340 includes a fastening portion 342, a central portion 344, a cone pin 346, at least one arm member fastener 348, and an arm member perforation 350. The main body 340 is formed by casting and machining a metal; however, it is understood that other processes may be used to form the main body 340.

The fastening portion 342 is an elongate member having a rectangular cross section. The arm member perforation 350 is formed lengthwise through the fastening portion 342 and has a diameter which permits the arm member 110'' to be disposed therethrough. The at least one arm member fastener 348 is threadingly disposed in a perforation that intersects the arm member perforation 350. When the at least one arm member fastener 348 is driven to engage the arm member 110'' disposed in the arm member perforation 350, the arm member 110'' is coupled to the main body 340. The fastening portion 342 includes an alignment protuberance 352 and an alignment recess 354.

The alignment protuberance 352 has a rectangular cross-section and extends from the fastening portion 342 in a manner substantially parallel to the arm member perforation 350. The alignment recess 354 is formed in the fastening portion 342 and has a substantially rectangular cross-section. A shape of the alignment recess 354 corresponds to at least a portion of the alignment protuberance 352. When two of the main bodies 340 are opposingly disposed on the arm member 110'', the main bodies may be positioned so that the alignment protuberances 352 and alignment recesses 354 respectively engage one another, militating against relative rotational movement therebetween about the arm member 110''.

The central portion 344 is an elongate member having a rectangular cross section. The central portion 344 is oriented transversely to the fastening portion 342. The cone pin 346 extends from a distal end of the central portion 344.

The cone pin 346 is integrally formed with the central portion 344, has a substantially circular cross-section and extends outwardly from the central portion 344 and is substantially parallel to the fastening portion 342. Alternately, the cone pin 346 may be coupled to the central portion 344 in any conventional manner. A diameter of the cone pin 346 substantially corresponds to the apertures 102 of the first end cone 19.

FIG. 9 shows an alternative embodiment of the anti-rotation device 100. Similar structural features of the anti-rotation device 100 include the same reference numeral and a triple prime (''') symbol.

An anti-rotation device 100''' includes an adjuster body 456, a support body 458, and an arm member 410. The arm member 410 is adjustably disposed within the adjuster body 456 and the support body 458. When the anti-rotation device 100''' is coupled to the first end cone 19, the anti-rotation device 100''' is in driving engagement therewith. The anti-rotation device 100''' is coupled to the first end cone by moving the arm member 410 through an adjuster perforation 460 and by disposing an adjuster fastener 462 through the adjuster body 456.

The adjuster body 456 is a U-shaped member the arm member 410 is adjustably disposed within. The adjuster body 456 includes a primary portion 464 and a secondary portion 466. The adjuster body 456 is formed by coupling the primary portion 464 to the secondary portion 466 with a plurality of fasteners; however, it is understood that the adjuster body may be unitarily formed.

The primary portion 464 is a L-shaped member. The primary portion 464 includes the adjuster perforation 460 formed therein at a first distal end and a perforation for receiving the adjuster fastener 462 formed therein at a second distal end. The adjuster perforation 460 includes a thread formed thereon, which is engaged with a corresponding thread formed on a shaft portion 468 of the arm member 410.

The secondary portion 466 is a L-shaped member. The secondary portion 466 includes a cone pin 470 extending therefrom at a first distal end and a perforation for receiving the adjuster fastener 462 formed therein at a second distal end. The cone pin 470 is coupled to the secondary portion 466 and has a substantially circular cross-section and extends outwardly from the secondary portion and is substantially coincident with the shaft portion 468 of the arm member 410. Alternately, the cone pin 470 may be coupled to the secondary portion 466 in any conventional manner. A diameter of the cone pin 470 substantially corresponds to the apertures of the first end cone.

The support body 458 is a L-shaped member. The support body 458 is coupled to the primary portion 464 at a first distal end and includes a perforation formed therethrough for receiving the shaft portion 468 at a second distal end. The perforation formed through the support body 458 is substantially aligned with the adjuster perforation 460. The support body 458 is preferably welded to the primary portion 464; however, it is understood that the support body 458 may be integrally formed with the primary portion 464 or coupled thereto in any conventional manner.

The arm member 410 is an elongate member having the shaft portion 468 and a bumper portion 132'''. The shaft portion 468 is a threaded rod and is rotatably coupled to the bumper portion 132''' at a first end thereof. A diameter of the shaft portion 468 substantially corresponds to the apertures 102 of the first end cone 19 and a second end thereof may be disposed in the apertures 102. The shaft portion 468 is threadingly disposed through the adjuster perforation 460 and may be secured thereto with a fastener such as a nut, for example. The shaft portion 468 is formed by forging a metal; however, it is understood that other processes may be used to form the shaft portion 468. The bumper portion 132''' is a disc shaped member rotatably coupled to a distal end of the shaft portion 468. At least a portion of the bumper portion 132''' is formed from a resilient material, such as rubber. However, it is understood that the bumper portion 132''' may have other shapes and may be formed from other materials.

Figure 10:
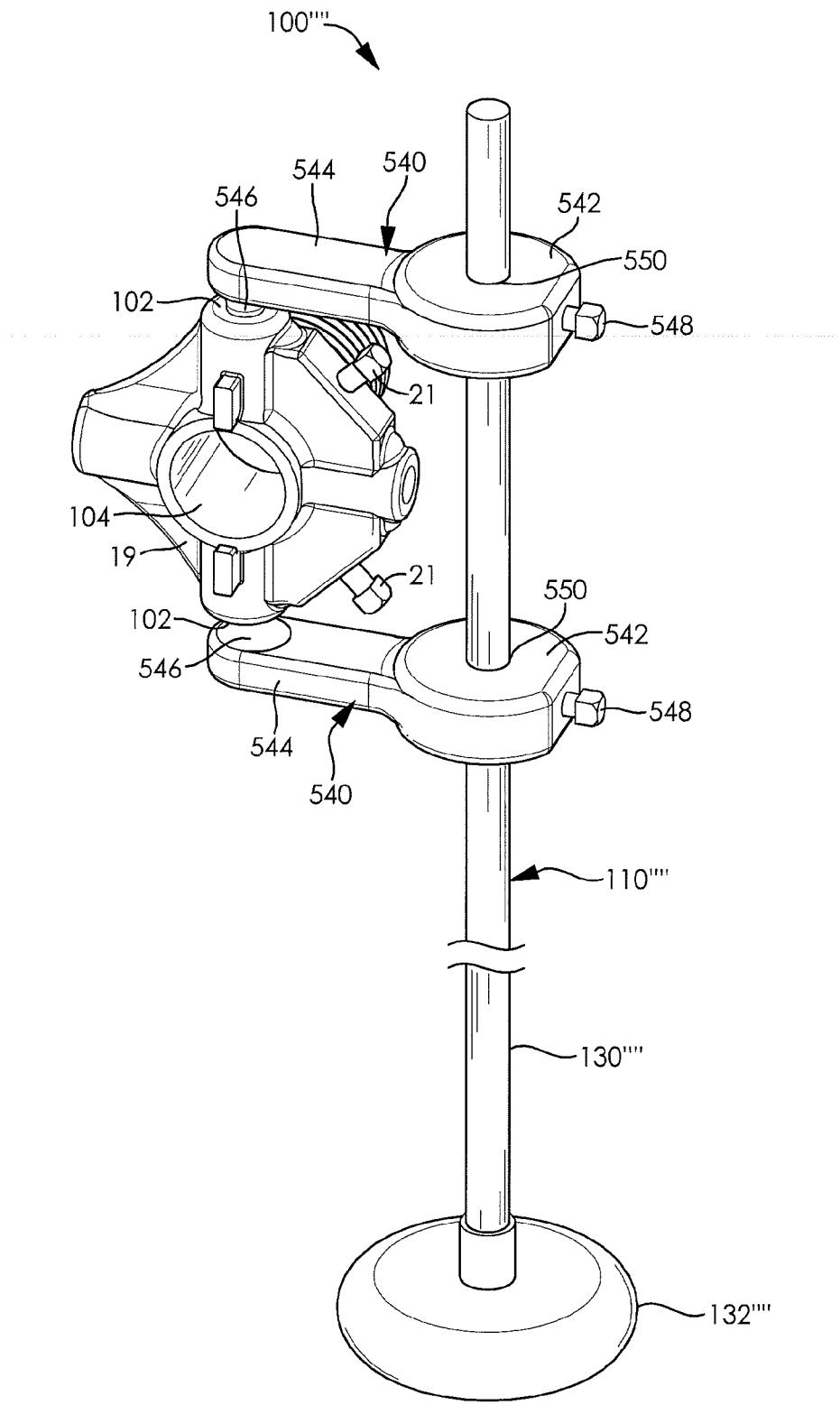
FIG. 10 is a perspective view of an anti-rotation device according to another embodiment of the present invention.

FIG. 10 shows an alternative embodiment of the anti-rotation device 100. Similar structural features of the anti-rotation device 100 include the same reference numeral and a quadruple prime ('''') symbol.

The anti-rotation device 100'''' includes two main bodies 540 and an arm member 110''''. The arm member 110'''' is adjustably disposed within the main bodies 540. The main bodies are opposingly disposed on the arm member 110''''. When the anti-rotation device 100'''' is coupled to the first end cone 19, the anti-rotation device 100'''' is in driving engagement therewith. The anti-rotation device 100'''' is coupled to the first end cone 19 by moving each of the main bodies 540 along the arm member 110''''.

Each of the main bodies 540 is a L-shaped member the arm member 110'''' is adjustably disposed within. The main body 540 includes a fastening portion 542, a central portion 544, a cone pin 546, and at least one arm member fastener 548. The main body 540 is formed by casting and machining a metal; however, it is understood that other processes may be used to form the main body 540.

The fastening portion 542 is a substantially cylindrical shaped body defining an arm member perforation 550 therethrough. The arm member perforation 550 has a diameter which permits the arm member 110'''' to be disposed therethrough. The at least one arm member fastener 548 is threadingly disposed in a perforation that intersects the arm member perforation 550. When the at least one arm member fastener 548 is driven to engage the arm member 110'''' disposed in the arm member perforation 550, the arm member 110'''' is coupled to the main body 540.

The central portion 544 is an elongate member having a rectangular cross section. The central portion 544 is oriented transversely to an axis of the fastening portion 542. The cone pin 546 extends from a distal end of the central portion 544.

The cone pin 546 is integrally formed with the central portion 544, has a substantially circular cross-section and extends outwardly from the central portion 544 and is substantially parallel to the axis of the fastening portion 542. Alternately, the cone pin 546 may be coupled to the central portion 544 in any conventional manner. A diameter of the cone pin 546 substantially corresponds to the apertures 102 of the first end cone 19.

In use, the spring winding device 10 and the anti-rotation device 100, 100', 100", 100'", 100"" are used to adjust an amount of counterbalancing force in one or more torsion springs 17 forming a portion of the torsion spring counterbalancing mechanism. FIG. 11 illustrates the anti-rotation device 100" being used to adjust an amount of counterbalancing force in one or more torsion springs 17.

First, one of the anti-rotation devices 100, 100', 100", 100'", 100"" is coupled to each of the first end cones 19. The cone pins 112, 118, the cone pins 112', 118', the cone pins 346 of each of the main bodies 340, the cone pin 470 and the second end of the shaft portion 468, or the cone pins 546 of each of the main bodies 540 are respectively disposed in the apertures 102 of each of the first end cones 19 to drivingly engage the first end cone 19 with one of the anti-rotation devices 100, 100', 100", 100'", 100"". By adjusting one of the first cone pin 112, 112', each of the arm member fasteners 348, the adjuster fastener 462 and the shaft portion 468, or each of the arm member fasteners 548, each of the anti-rotation devices 100, 100', 100", 100'", 100"" may be coupled and drivingly engaged with one of the first end cones 19. Further, it is understood that a length of the arm member 110, 210, 110", 410, 110"" may be adjusted based on an amount of counterbalancing force stored in the torsion springs 17 or an amount of counterbalancing force to be stored in the torsion springs 17.

Next, the fastener 49 coupling the flanged worm gear 14 to the support bracket 12 is removed. The fastener 49 is removed from one of the set perforations 48 of the gear portion 38 and the flanged worm gear fastening perforation 29 of the main portion 26. Preferably, the fastener 49 is disposed through the flanged worm gear fastening perforation 29 and engaged with a thread formed in one of the set perforations 48; however, it is understood that other fasteners, such as a nut and a bolt, may be used.

Next, the at least one set screw 21 of each of the first end cones 19 are adjusted to disengage the first end cone 19 from the torsion shaft 18. When the first end cones 19 are disengaged from the torsion shaft 18, the amount of counterbalancing force stored in the torsion springs 17 is applied to the anti-rotation device 100, 100', 100", 100'", 100"" engaged with each of the first end cones 19. As a result, the bumper portion 132, 132', 132", 132'", 132"" of each of the anti-rotation devices 100, 100', 100", 100'", 100"" contacts the wall 24 or the overhead door to resist the amount of counterbalancing force stored in the torsion springs 17.

Next, the amount of counterbalancing force stored in the torsion springs 17 is adjusted using the spring winding device 10. The amount of counterbalancing force stored in the torsion springs 17 may be increased or decreased by rotating the drive gear 60. When the driving tool engaged with the drive end 72 of the drive gear 60 is rotated, the drive gear 60 rotates and the at least one thread 68 applies a force to the toothed outer edge 46 of the flanged worm gear 14, causing the flanged worm gear 14 to rotate within the support bracket 12.

The second end cones 20, which are coupled to the flanged worm gear 14, rotate in response to rotation of the drive gear 60 and the amount of counterbalancing force stored in the torsion springs 17 is adjusted simultaneously. As shown in FIGS. 1-3 and 11, the spring winding device 10 is used to adjust the amount of counterbalancing force stored in two torsion springs 17. Depending on a direction the drive gear 60 is rotated, the amount of counterbalancing force stored in the torsion springs 17 may be increased or decreased. It is understood that at least one of the flanged worm gear 14 and the support bracket 12 may be fitted with a device (not shown) for counting a number of rotations made by the flanged worm gear 14 during the process used to adjust the amount of counterbalancing force stored in the torsion springs 17. Such a device facilitates properly adjusting the amount of counterbalancing force stored in the torsion springs 17.

The anti-rotation devices 100, 100', 100", 100'", 100"" are able to move with respect to the torsion shaft 18 as the amount of counterbalancing force stored in each of the torsion springs 17 coupled thereto is adjusted. It is understood that when the amount of counterbalancing force stored in each of the torsion springs 17 is adjusted, a length of each of the torsion springs 17 changes. In response to the length of each of the torsion springs 17 changing, the bumper portion 132, 132', 132", 132'", 132"" of each of the anti-rotation devices 100, 100', 100", 100'", 100"" rotates about the arm member 110, 210, 110", 410, 110"" against the wall 24 and the anti-rotation devices 100, 100', 100", 100'", 100"" and the first end cones 19 move along the torsion shaft 18. The anti-rotation devices 100, 100', 100", 100'", 100"" militate against a binding that may occur to the torsion springs 17 if the amount of counterbalancing force stored in each of the torsion springs 17 is adjusted without allowing the length of each of the torsion springs 17 to change.

Once a desired amount of counterbalancing force stored in the torsion springs is obtained, the flanged worm gear 14 is coupled to the support bracket 12. The fastener 49 is disposed through the flanged worm gear fastening perforation 29 of the main portion 26 and into one of the set perforations 48 of the gear portion 38 and the fastener 49 is tightened to militate against relative movement from occurring between the flanged worm gear 14 and the support bracket 12.

Next, the at least one set screw 21 of each of the first end cones 19 are adjusted to engage each of the first end cones 19 with the torsion shaft 18, allowing the amount of counterbalancing force stored in the torsion springs 17 to be applied to the torsion shaft.

Lastly, each of the anti-rotation devices 100, 100', 100", 100'", 100"" coupled to the first end cones 19 is removed. By reversing the above procedure used to couple the anti-rotation devices 100, 100', 100", 100'", 100"" to the first end cones 19, the anti-rotation devices 100, 100', 100", 100'", 100"" are removed from the first end cones 19, and the process used to adjust the amount of counterbalancing force in one or more torsion springs 17 is completed.

Further, it is understood that the spring winding device 10 and a pair of the keyed end cones 19' may also be used to adjust an amount of counterbalancing force in one or more torsion springs 17 forming a portion of the torsion spring counterbalancing mechanism. In use, the spring winding device 10 and the keyed end cones 19' are used to adjust an amount of counterbalancing force in one or more torsion springs 17 forming a portion of the torsion spring counterbalancing mechanism, without the use of one of the anti-rotation devices 100, 100', 100", 100'", 100"".

First, the at least one set screw 21 of each of the keyed end cones 19' are adjusted to disengage the keyed end cones 19' from the torsion shaft 18. When the keyed end cones 19' are disengaged from the torsion shaft 18, each of the keyed end cones 19' is able to be moved along a length of the torsion shaft 18 while maintaining driving engagement with the torsion shaft 18.

Next, the amount of counterbalancing force stored in the torsion springs 17 is adjusted using the spring winding device 10. The amount of counterbalancing force stored in the torsion springs 17 may be increased or decreased by rotating the drive gear 60. When the driving tool engaged with the drive end 72 of the drive gear 60 is rotated, the drive gear 60 rotates and the at least one thread 68 applies a force to the toothed outer edge 46 of the flanged worm gear 14, causing the flanged worm gear 14 to rotate within the support bracket 12. The second end cones 20, which are coupled to the flanged worm gear 14, rotate in response to rotation of the drive gear 60 and the amount of counterbalancing force stored in the torsion springs 17 is adjusted simultaneously.

In response to the amount of counterbalancing force stored in the torsion springs 17 being adjusted, each of the keyed end cones 19' move along the torsion shaft 18 as a length of each of the torsion springs 17 coupled thereto is adjusted. The key 23 of each of the keyed end cones 19' move along keyway 22 of the torsion shaft 18 in response to an axial force generated by the amount of counterbalancing force stored in the torsion springs 17 being adjusted. When the amount of counterbalancing force stored in the torsion springs 17 is increased, the length of each of the torsion springs 17 decreases, and each of the keyed end cones 19' move along the torsion shaft 18 towards the spring winding device 10. When the amount of counterbalancing force stored in the torsion springs 17 is decreased, the length of each of the torsion springs 17 increases, and each of the keyed end cones 19' move along the torsion shaft 18 away from the spring winding device 10.

Once a desired amount of counterbalancing force stored in the torsion springs is obtained, the flanged worm gear 14 is coupled to the support bracket 12. The fastener 49 is disposed through the flanged worm gear fastening perforation 29 of the main portion 26 and into one of the set perforations 48 of the gear portion 38 and the fastener 49 is tightened to militate against relative movement from occurring between the flanged worm gear 14 and the support bracket 12.

Lastly, the at least one set screw 21 of each of the keyed end cones 19' are adjusted to fix each of the keyed end cones 19' with respect to the torsion shaft 18. When the keyed end cones 19' are fixed to the torsion shaft 18, each of the keyed end cones 19' is unable to be moved along a length of the torsion shaft 18.

The keyed end cone 19' having the key 23 formed thereon eliminates a need for one of the anti-rotation devices 100, 100', 100'', 100''', 100'''' when an amount of counterbalancing force stored in each of the torsion springs 17 is adjusted.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A counterbalancing force adjustment device for a counterbalancing mechanism, the counterbalancing force adjustment device comprising:
    an anti-rotation device comprising an elongate member and a bumper portion, the bumper portion coupled to the elongate member;
    a spring winding device comprising:
    a support bracket;
    a worm gear rotatably coupled to the support bracket, the worm gear including a mount portion for coupling a first end cone thereto; and
    a drive gear rotatably disposed adjacent the support bracket, the drive gear drivingly engaged with the worm gear, wherein the anti-rotation device is drivingly engaged with a second end cone to militate against a rotation thereof and a rotation of the drive gear causes the first end cone to rotate with the worm gear, causing an amount of counterbalancing force stored in a torsion spring coupled to the first end cone and the second end cone to be adjusted.

2. The counterbalancing force adjustment device according to claim 1, wherein the anti-rotation device further comprises at least one pinned member for engaging the second end cone, the elongate member adjustably coupled to the pinned member.

3. The counterbalancing force adjustment device according to claim 2, wherein the at least one pinned member is a L-shaped member.

4. The counterbalancing force adjustment device according to claim 1, wherein the bumper portion is rotatably coupled to the elongate member to facilitate a changing length of the torsion spring when the amount of counterbalancing force stored in the torsion spring is adjusted.

5. The counterbalancing force adjustment device according to claim 1, wherein the worm gear includes a gear portion, the worm gear rotatably supported by the support bracket between the mount portion and the gear portion.

6. The counterbalancing force adjustment device according to claim 1, wherein the support bracket comprises a main portion and a retaining portion, the retaining portion coupled to the main portion to restrain the worm gear within the support bracket.

7. The counterbalancing force adjustment device according to claim 1, wherein the support bracket and the worm gear each define at least one set perforations which may be aligned with one another.

8. A method of adjusting an amount of force stored in a pair of springs of a counterbalancing mechanism, the method comprising the steps of:
    providing a first spring disposed about a shaft, the first spring and shaft forming a portion of the counterbalancing mechanism, the first spring drivingly engaged with the shaft at a first end thereof;
    providing a second spring disposed about the shaft, the second spring and shaft forming a portion of the counterbalancing mechanism, the second spring drivingly engaged with the shaft at a first end thereof;
    providing a spring winding device for the counterbalancing mechanism, the spring winding device comprising a rotatable portion and a support portion, the rotatable portion for coupling a second end of the first spring and a second end of the second spring thereto, the support portion and the rotatable portion each defining at least one perforation which may be aligned with one another; and
    adjusting the amount of force stored in the pair of springs of the counterbalancing mechanism simultaneously by rotating the rotatable portion of the spring winding device.

9. A method of adjusting an amount of force stored in a spring of a counterbalancing mechanism, the method comprising the steps of:
    providing the spring disposed about a shaft having a keyway formed therein, the spring and shaft forming a portion of the counterbalancing mechanism, the spring drivingly engaged with the shaft at a first end thereof through the use of a keyed mounting cone, the keyed mounting cone able to be moved along the keyway of the shaft;

providing a spring winding device for the counterbalancing mechanism, the spring winding device comprising a rotatable portion and a support portion, the rotatable portion for coupling a second end of the first spring and a second end of the second spring thereto, the support portion and the rotatable portion each defining at least one perforation which may be aligned with one another; and adjusting the amount of force stored in the counterbalancing mechanism by rotating the rotatable portion of the spring winding device, wherein in response to the amount of force stored in the counterbalancing mechanism being adjusted, a position of the keyed mounting cone moves along the shaft as a length of the spring changes.

10. A method of adjusting an amount of force stored in a spring of a counterbalancing mechanism, the method comprising the steps of:

providing the spring disposed about a shaft, the spring and shaft forming a portion of the counterbalancing mechanism, the spring drivingly engaged with the shaft at a first end thereof;

providing a spring winding device for the counterbalancing mechanism, the spring winding device comprising a support bracket, a worm gear rotatably coupled to the support bracket, the worm gear including a mount portion for coupling a second end of the spring thereto, and a drive gear rotatably disposed adjacent the support bracket, the drive gear drivingly engaged with the worm gear, wherein a rotation of the drive gear causes the worm gear to rotate within the support bracket;

providing an anti-rotation device comprising an elongate member and a bumper portion, the bumper portion coupled to the elongate member;

drivingly engaging the anti-rotation device with the first end of the spring;

releasing the first end of the spring from driving engagement with the shaft;

adjusting the amount of force stored in the counterbalancing mechanism by rotating the drive gear;

drivingly engaging the first end of the spring with the shaft; and releasing the anti-rotation device from driving engagement with the first end of the spring.

* * * * *